(12) United States Patent
Nitkowski et al.

(10) Patent No.: US 9,574,941 B2
(45) Date of Patent: Feb. 21, 2017

(54) DISPERSED FOURIER TRANSFORM SPECTROMETER, METHODS AND SYSTEMS

(75) Inventors: Arthur Nitkowski, Ithaca, NY (US); Arsen Hajian, Toronto (CA)

(73) Assignee: TORNADO SPECTRAL SYSTEMS, INC., Toronto, Ontario (CA)

( * ) Notice: Subject to any disclaimer, the term of this patent is extended or adjusted under 35 U.S.C. 154(b) by 163 days.

(21) Appl. No.: 14/122,750

(22) PCT Filed: May 30, 2012

(86) PCT No.: PCT/CA2012/000524
§ 371 (c)(1),
(2), (4) Date: Nov. 27, 2013

(87) PCT Pub. No.: WO2012/162808
PCT Pub. Date: Dec. 6, 2012

(65) Prior Publication Data
US 2014/0092385 A1    Apr. 3, 2014

Related U.S. Application Data

(60) Provisional application No. 61/491,612, filed on May 31, 2011.

(51) Int. Cl.
*G01J 3/45*    (2006.01)
*G01J 3/18*    (2006.01)
(Continued)

(52) U.S. Cl.
CPC ............... *G01J 3/45* (2013.01); *G01J 3/0218* (2013.01); *G01J 3/18* (2013.01); *G01J 3/4531* (2013.01)

(58) Field of Classification Search
CPC ............. G01J 3/45; G01J 3/0218; G01J 3/18; G01J 3/4531; G01B 2290/20; G01B 2290/40
(Continued)

(56) References Cited

U.S. PATENT DOCUMENTS 6,160,626 A * 12/2000 Debeau ................... G01J 11/00
356/451
7,518,728 B2    4/2009 Koo
(Continued)

OTHER PUBLICATIONS

Gotzinger et al (High speed full range complex spectral domain optical coherence tomography, Opt Express, Jan. 24, 2005; 13(2): pp. 583-594.*
(Continued)

*Primary Examiner* — Tarifur Chowdhury
*Assistant Examiner* — Jonathon Cook
(74) *Attorney, Agent, or Firm* — Roberts Mlotkowski Safran Cole & Calderon, PC

(57) ABSTRACT

A spectrometer is provided, the spectrometer having an interferometer generating an interferogram by splitting an interferometer input signal between a reference arm and a variable delay arm, and introducing a delay between the split interferometer input signals prior to interfering the split interferometer input signals. The spectrometer additionally has a controllable delay element operable to adjust the delay introduced by the interferometer and a dispersive element outputting a plurality of narrowband outputs representative of a received broadband input signal. The interferometer and dispersive element are optically connected to output a plurality of narrowband interferograms representative of a spectra of a spectrometer input signal received by the spectrometer, and the plurality of narrowband interferograms are received by a detector array for analysis.

11 Claims, 8 Drawing Sheets

(51) Int. Cl.
*G01J 3/453* (2006.01)
*G01J 3/02* (2006.01)

(58) Field of Classification Search
USPC .......................................................... 356/451
See application file for complete search history.

(56) References Cited

U.S. PATENT DOCUMENTS

| | | |
|---|---|---|
| 7,796,270 B2 | 9/2010 | Yelin et al. |
| 7,889,348 B2 | 2/2011 | Tearney et al. |
| 7,903,257 B2 | 3/2011 | de Boer et al. |
| 8,767,217 B2 * | 7/2014 | Hajian .................. G01J 3/0294 356/497 |
| 2004/0201850 A1 | 10/2004 | Hajian et al. |
| 2008/0170225 A1 * | 7/2008 | de Boer ............... A61B 5/0059 356/327 |
| 2010/0091282 A1 * | 4/2010 | Wang ................... A61B 5/0059 356/369 |
| 2011/0149294 A1 * | 6/2011 | Song ..................... G01N 21/45 356/477 |
| 2012/0050744 A1 * | 3/2012 | Takada ..................... G01J 3/45 356/451 |

OTHER PUBLICATIONS

International Preliminary Examination report on patentability PCT/CA2012/000524 mailed Dec. 12, 2011.

* cited by examiner

DISPERSED FOURIER TRANSFORM SPECTROMETER, METHODS AND SYSTEMS

RELATED APPLICATIONS

This application claims priority from U.S. Provisional Application No. 61/491,612 filed May 31, 2011, the contents of which are herein incorporated by reference.

FIELD OF INVENTION

This invention relates to spectrometry and more specifically relates to apparatus and methods for a dispersed Fourier transform spectrometer.

SUMMARY OF THE INVENTION

In an aspect of the invention, a spectrometer is provided, the spectrometer comprising: an interferometer generating an interferogram by splitting an interferometer input signal between a reference arm and a variable delay arm, and introducing a delay between the split interferometer input signals prior to interfering the split interferometer input signals; a controllable delay element operable to adjust the delay introduced by the interferometer; a dispersive element outputting a plurality of narrowband outputs representative of a received broadband input signal; and a detector array; wherein the interferometer and dispersive element are optically connected to output a plurality of narrowband interferograms representative of a spectra of a spectrometer input signal received by the spectrometer, and the plurality of narrowband interferograms are received by the detector array for analysis.

In some embodiments, the reference arm and variable delay arm are waveguides formed on a substrate and in some additional embodiments, the controllable delay element can adjust the refractive index of a portion of the variable delay arm to introduce the delay. In some embodiments, the variable delay arm can be a spiral shape and in some embodiments the reference arm and delay arm can be comprised of materials that are transparent of the wavelength range of interest, such as silicon, silicon oxynitride, silicon nitride, doped glass, or other polymers.

In some embodiments, the controllable delay element can adjust the refractive index of a portion of the variable delay arm by changing the temperature of the variable delay arm and in other embodiments, the controllable delay element can adjust the refractive index of the variable delay arm by the electro-optic effect.

In some embodiments, the spectrometer can further comprise a second controllable delay element that can be operable to adjust the refractive index of a portion of the reference arm to introduce a second delay.

In some embodiments, the delay arm can be comprised of multiple delay paths and an optical switch for selecting one of the multiple delay paths.

In some embodiments, the interferometer input signal can be the spectrometer input signal and the dispersive input signal can be the interferogram. In some embodiments, the spectrometer can further comprise additional dispersive elements each having an associated detector array, wherein the optical connection between the interferometer and the dispersive elements is a bus waveguide optically coupled to a plurality of filtering devices, each filtering device associated with one of the dispersive elements. In some embodiments, each filtering device can be capable of transmitting a predetermined bandwidth of the interferogram to its associated dispersive element and in some embodiments, each filtering device can be a ring resonator, a disk resonator, a racetrack resonator, a photonic crystal cavity.

In some embodiments, the spectrometer can further comprise an input connector for connecting with a fiber input to receive the spectrometer input signal and in some embodiments, can additionally comprise additional interferometers each having an associated dispersive element and detector array, the spectrometer further comprising additional input connectors for connecting with fiber inputs of a multimode fiber input to receive a plurality of spectrometer input signals each associated with an interferometer and dispersive element pair.

In some embodiments, the dispersive input signal can be the spectrometer input signal and one of the plurality of narrowband outputs can be the interferometer input signal. In such embodiments, the spectrometer can further comprise additional interferometers equal to the number of narrowband outputs output by the dispersive element and each receiving one of the plurality of narrowband outputs to generate the plurality of narrowband interferograms for receipt by the detector array.

In some embodiments, the spectrometer can further comprise an external optical source of a known wavelength and a pick-off filter to pick-off a wavelength portion of the known wavelength wherein the external optical source can be added to the interferometer input signal and the pick-off filter can receive the interferogram to generate a picked off interferogram for analysis to determine the optical path difference between the reference arm and the variable delay arm.

In some embodiments, the interferometer can generate a second interferogram by interfering the split interferometer input signals and the second interferogram is received by a second detector array to normalize the first interferogram. In such embodiments, the first interferogram can be normalized according to the equation: $A'=A/(A+B)$, wherein A is the first interferogram and B is the second interferogram. In other such embodiments, a third interferogram can be generated according to the equation: $C=A'-B'$ wherein C is the third interferogram and B' is a normalized second interferogram generated according the equation: $B'=B/(A+B)$ wherein the third interferogram is representative of A' and B' where correlated noise components have been filtered out.

In another aspect of the invention, a method for generating a plurality of narrowband interferograms representative of a spectra of an input signal is provided, the method comprising: splitting the input signal; introducing a delay between the split input signals; interfering the split input signals after having introduced the delay to generate an interferogram; and dispersing the interferogram into the plurality of narrowband interferograms representative of the spectra of the input signal.

In a further aspect of the invention, a method for generating a plurality of narrowband interferograms representative of a spectra of an input signal is provided, the method comprising: dispersing the input signal into a plurality of narrowband outputs representative of the spectra of the input signal; splitting each of the plurality of narrowband outputs; introducing a delay between each of the plurality of split narrowband outputs; and interfering each of the plurality of split narrowband outputs after having introduced the delay to generate the plurality of narrowband interferograms.

In another aspect of the invention, a spectrometer is provided comprising: an interferometer capable of generating an interferogram by splitting an interferometer input signal between a reference arm and a variable delay arm and introducing a delay between the split interferometer input signals prior to interfering the split interferometer input signals; a controllable delay element operable to adjust the delay introduced by the interferometer; and a detector array capable of receiving the interferogram for analysis.

In some embodiments, the interferometer can generate a second interferogram by interfering the split interferometer input signals. In some such embodiments, the second interferogram can be received by a second detector array to determine an optical path length difference between the reference arm and variable delay arm.

In other embodiments, the second interferogram can be received by a second detector array to normalize the first interferogram and in some such embodiments, the first interferogram can be normalized according to the equation: A'=A/(A+B), wherein A is the first interferogram and B is the second interferogram. In other embodiments, a third interferogram can be generated according to the equation: C=A'−B', wherein C is the third interferogram and B' is a normalized second interferogram generated according the equation: B'=B/(A+B), wherein the third interferogram is representative of A' and B' where correlated noise components have been filtered out.

BRIEF DESCRIPTION OF THE DRAWINGS

For a better understanding of embodiments of the system and methods described herein, and to show more clearly how they may be carried into effect, reference will be made by way of example, to the accompanying drawings in which.

DETAILED DESCRIPTION

Figure 1:
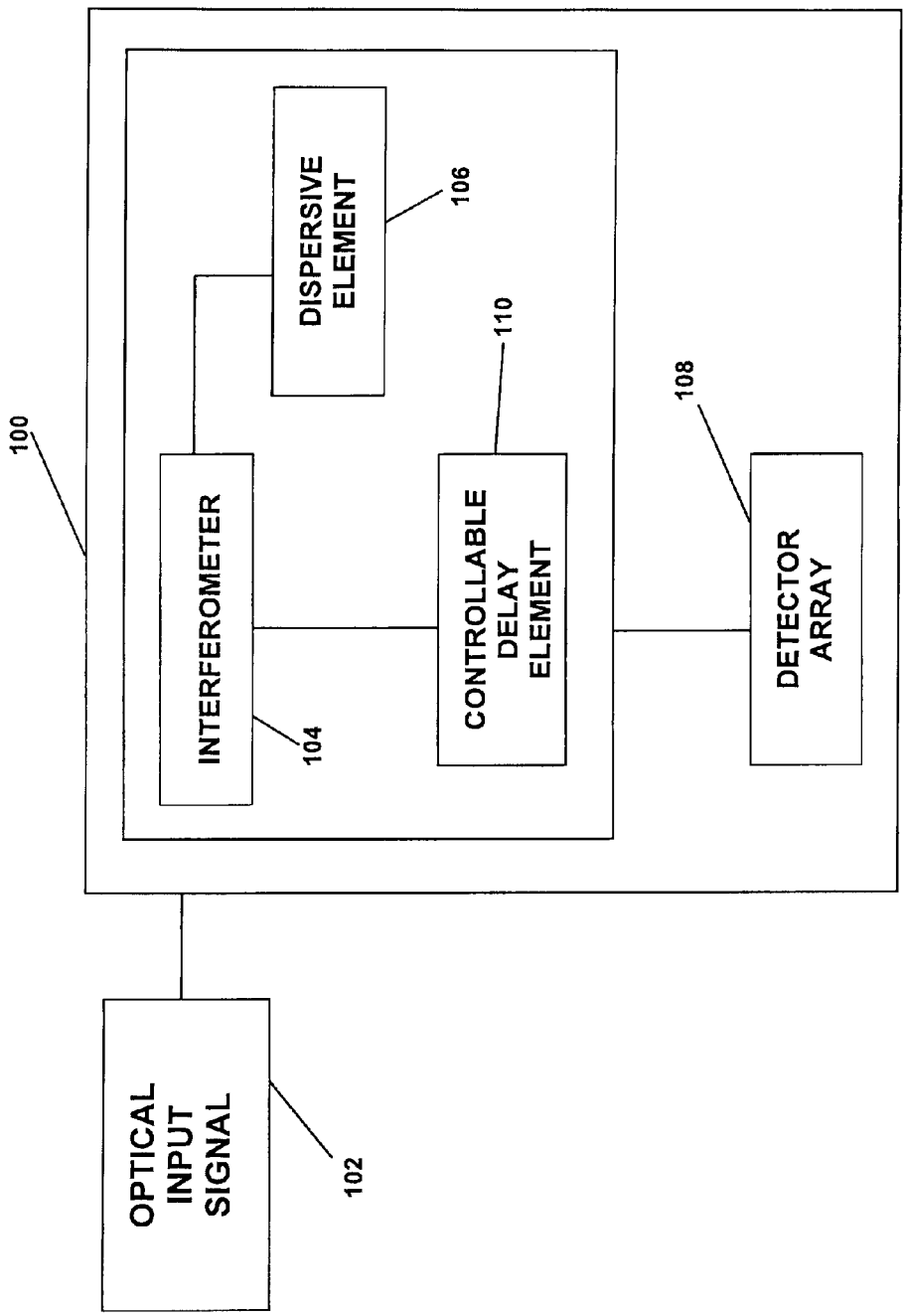
FIG. 1 shows a block diagram representation of an embodiment of a dispersed Fourier transform spectrometer.

A typical Fourier transform spectrometer includes an optical input signal which is input to an interferometer. The interferometer splits the input signal into two paths, or arms; one arm having a fixed path length and the other introducing a tunable delay relative to the first arm. The light signals are recombined and the resulting intensity is measured as a function of delay to generate an interferogram. The interferogram can be analyzed by Fourier transformation to obtain the spectra of the original optical input signal received by the interferometer.

Several disadvantages exist with current Fourier transform spectrometer systems. For example, with typical Fourier transform spectrometers, the resolving power of the system is proportional to the maximum value of the delay between the arms of the interferometer (i.e. optical path difference). However, longer optical path length delays lead to a lower signal-to-noise ratio in the resulting interferogram. This can be understood by first considering a monochromatic input signal, which will result in strong interference for all optical delay lengths due to the long coherence length of the source. As more wavelengths are added to the input signal, the interference pattern tends to lose contrast at longer delays and interference fringes will be smeared out due to the decrease in the source's coherence length which is inversely proportional to the source bandwidth. For example, for a broad bandwidth input light signal, the interferogram signal may not deviate significantly from the mean intensity due to the presence of many wavelengths, tending to decrease the signal-to-noise ratio. In such spectrometers, there will tend to be a tradeoff between resolution and sensitivity for a broadband optical input signal.

One way in which current Fourier transform spectrometers attempt to resolve this issue is to narrow the bandwidth of the initial input signal, for example by using components that filter an incoming optical signal to produce an output with a narrow bandwidth.

The ability to perform high resolution spectrometry in a miniaturized and portable device also tends to be a desirable functionality for spectrometry. By leveraging fabrication techniques of the microelectronics industry, waveguide-based spectrometers can be integrated on a chip which may increase the system's robustness while reducing size and cost. However, on-chip implemented spectrometer systems, such as those based on arrayed waveguide gratings or echelle grating can tend to be of narrow bandwidths or low resolution because of characteristics of the materials used or design limitations. In on-chip designs of Fourier transform spectrometers, multiple interferometers can be implemented on the chip, each having a different delay, with the output signals combinable to generate an interferogram for spectral analysis; however, these on-chip systems can tend to require a large footprint, have reduced sensitivity since light is divided into a number of interferometers, and have a reduced spectral bandwidth due to the finite and limited sampling of different optical path delays. Therefore there is a need for an on-chip spectrometer which can deliver high resolution, over a broad spectral range with high sensitivity.

It will be appreciated that for simplicity and clarity of illustration, where considered appropriate, reference numerals may be repeated among the figures to indicate corresponding or analogous elements or steps. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures, and components have not been described in detail so as not to obscure the embodiments described herein. Furthermore, this description is not to be considered as limiting the scope of the embodiments described herein in any way, but rather as merely describing the implementation of the various embodiments described herein.

The sensitivity of a Fourier transform spectrometry system can tend to be increased by dispersing the output of the interferometer by a grating or other dispersive element and imaging the various spectral components into a linear detector array to create a dispersive Fourier transform spectrometer. Dispersing the output of the interferometer can tend to narrow the bandwidth of each of the dispersed output signals which can tend to increase the coherence length, leading to a wider interferogram signal and a higher signal-to-noise ratio (SNR). A dispersed Fourier transform system generates a plurality of high-SNR interferograms, each being at different wavelength bands, which can be later combined to form a spectrum that tends to have high resolution and sensitivity. In some embodiments, the SNR can be increased by a factor of $R^{1/2}$ (where R is the resolving power of the grating).

The implementation of spectrometry in a miniaturized and portable device can provide advantages for industries such as the bio-sensing or space industry, for which spectrometry using free-space optics may be difficult due to the size of such equipment. Additionally, the implementation of spectrometry on a miniaturized chip can tend to be advantageous in that such a chip tends to be substantially planar. In addition, spectrometry using free space optics tends to include moving parts that require alignment prior to use, while implementing spectrometry on a chip, such chip-based spectrometry systems tend to have no moving parts, requiring minimal calibration.

With reference to FIG. 1, a block diagram of dispersed Fourier transform spectrometer 100 is shown. Spectrometer 100 comprises interferometer 104, dispersive element 106, controllable variable delay element 110 and detector array 108.

Interferometer 104 can receive an interferometer optical input signal and generate an interferogram by splitting the interferometer input signal between a reference arm and a variable delay arm, introducing a relative delay between the split signals and interfering the split signals to generate an interferogram.

In some embodiments, interferometer 104 can be implemented on a planar substrate or a chip, and can be constructed of silicon nitride elements; however, in some embodiments, elements can be construed of silicon, silicon oxynitride, doped glass or other polymers. In some embodiments, interferometer 104 includes a beam splitter for splitting the interferometer input signal into two optical signals. Interferometer 104 can further include a reference arm and a variable delay arm, which in some embodiments can be waveguides implemented on the planar substrate or chip. In such embodiments, each of the two optical signals generated by the beam splitter are each directed to one of the reference arm and variable delay arm.

During operation of interferometer 104 a delay is introduced between the reference arm and variable delay arm by controllable delay element 110. For example, in some embodiments, a delay can be introduced into the split optical signal directed through variable delay arm, in some embodiments being introduced by altering the refractive index of a portion of the variable delay arm. The refractive index of the variable delay arm, in some embodiments, can be changed by controllable delay element 110 by altering the temperature of the variable delay arm. For example, in embodiments where the variable delay arm is a waveguide on a planar substrate and constructed of silicon nitride, the introduction of heat (where controllable delay element 110 is a heater) and/or cold (where controllable delay element 110 is a cooling system) can adjust the refractive index of the waveguide material such that optical signals may speed up or slow down as they travel through the variable delay arm.

In other embodiments, controllable delay element 110 can alter the refractive index of the variable delay arm by the electro-optic effect. For example, in such embodiments a voltage can be applied across an electro-optic material which can change the refractive index of the waveguide material of the variable delay arm. In other embodiments, dopants can be implanted in and/or around the waveguide which can form a diode structure. In such embodiments, electrons and holes can be injected or removed from the waveguide which can alter the refractive index of the material of the waveguide. Skilled persons will appreciate that in other embodiments, additional controllable delay elements can be used to alter the refractive index of the reference arm in addition to the variable delay arm, in a similar matter.

Interferometer 104, in some embodiments, may further comprise a beam recombiner that receives the split optical signals from the reference arm and variable delay arm and combines or interferes the signals to generate an interferogram. In some embodiments, the beam recombiner can produce a single output, which, in such embodiments, combines or interferes the split beams to form a single beam projecting an interferogram. In other embodiments, the beam recombiner can produce two outputs after receiving and interfering the split optical signal from the reference arm and the delay arm, each output projecting an interferogram.

Figure 8:
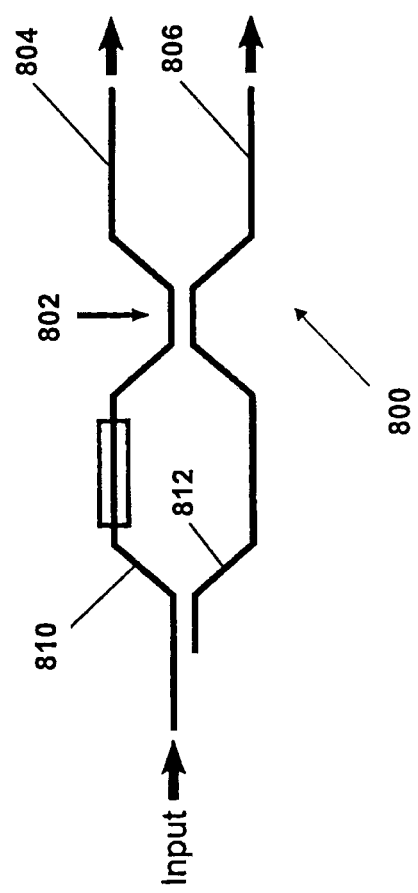
FIG. 8 shows a representation of an interferometer capable of outputting two interferograms.

With additional reference to FIG. 8, in such embodiments, first interferogram 804 can be used to determine a spectrum of the optical input signal while second interferogram 806 can be used to normalize any power fluctuations in the optical input signal.

For example, in such embodiments, if the first interferogram 804 is output A and the second interferogram 806 is output B, power fluctuations in the optical input signal can be corrected by dividing each interferogram 804 or 806 by the sum of the two interferograms 804 and 806.

For example, the normalized interferograms A' and B' can be characterized as A'=A/(A+B) and B'=B/(A+B). In such embodiments, if the optical input signal gets stronger or weaker while interferometer 800 is scanning a sample, normalization of the interferograms 804 and 806 of interferometer 800 can eliminate false interferometric maxima and minima which can be introduced by such signal fluctuations. In such embodiments, the first and second interferograms 804 and 806 can be complimentary outputs whose sum can be linearly proportional to the optical input signal. In embodiments where intrinsic signal portions of A' and B' are 180° out of phase, taking the difference between the signals can produce a third interferogram C, where C=(A'−B') where C is an interferogram where correlated noise components present in each of A' and B' have been filtered out.

In other embodiments, first interferogram 804 or second interferogram 806 can be used to determine the optical path difference of interferometer 800. For example, in some embodiments, an external optical source of a known wavelength (not shown), such as a laser, can be added to the interferometer input signal. In such embodiments, a pick-off filter can be positioned to receive first interferogram 804 or the second interferogram 806 within a predetermined spectral bandpass corresponding to the laser wavelength. The interferogram generated within this picked-off portion of the spectrum can be analyzed to determine the optical path difference of the interferometer 800, for instance, by counting the whole and partial number of interferometric maxima which appear as the variable delay arm is scanned. In such embodiments, the change in optical delay can equal the number of maxima multipled by the wavelength of the laser light in the waveguide. In other embodiments, multiple laser wavelengths can be used to determine the absolute optical delay offset from the equal path length position. Skilled persons will understand that in embodiments that generate one interferogram that the input of an external optical source of known wavelength with a pick-off filter can additionally be used to determine the optical path length difference of the interferometer.

Referring back to FIG. 1, skilled persons will understand that in some embodiments interferometer 104 can be a Mach-Zehnder interferometer, a Michelson interferometer or any other interferometer capable of receiving an optical signal and generating an interferogram.

As discussed above, spectrometer 100 further includes dispersive element 106 which can receive a broadband input signal and output a plurality of narrowband outputs that are representative of the received broadband input signal. In some embodiments, dispersive element 106 can be implemented on a planar substrate or a chip, and in some embodiments can be implemented on the same planar substrate or chip as interferometer 104. In such embodiments, the spectral resolution of spectrometer 100 can tend to be higher than spectrometers having a dispersive element or interferogrameter alone.

In the embodiment shown in FIG. 1, interferometer 104 and dispersive element 106 are optically connected to generate a plurality of narrowband interferograms that are representative of the spectra of spectrometer optical input 102 which are received by detector array 108 for spectral analysis. For example, in the embodiment shown, detector array 108 can be connected to a processor (not shown) which can, by Fourier transformation of each of the plurality of narrowband interferograms, obtain, analyze and/or process the spectra of spectrometer optical input 102. In such embodiments, the spectral resolution of spectrometer 100 can tend to be higher than spectrometers having a dispersive element or interferometer alone.

The dispersion and interference of the optical input signal generated by optical input source 102 can occur in either order. For example, in some embodiments, interferometer 104 can receive optical input source 102 to generate an interferogram as discussed above and dispersive element 106 can receive the interferogram to produce a plurality of narrowband interferograms representative of the spectra of optical input signal 102 for analysis by detector array 108. In other embodiments dispersive element 106 can receive optical input source 102 to produce a plurality of narrowband outputs representative of the spectra of optical input source 102 and interferometer 104 can receive one of the narrowband outputs to produce an interferogram for analysis by detector 108. In such embodiments where dispersive elements 106 receives optical input signal 102, a plurality of interferometers 104 each associated with a controllable delay element 110 can each receive one of the narrowband outputs of dispersive element 106 to produce a plurality of interferograms representative of optical input signal 102 for analysis by detector array 108. In other embodiments additional optical elements, such as optical switches can be used to cycle each of the narrowband outputs from dispersive element 106 generated by receiving optical input signal 102 through interferometer 104 to generate a plurality of interferograms, one on each cycle, each for analysis by detector array 108.

In other embodiments, spectrometer 100 need not include dispersive element 106, and in such embodiments, the interferogram generated by interferometer 104 can be received by detector array 108 which can be connected to a processor (not shown) which can, by Fourier transformation of the interferogram, obtain, analyze and/or process the spectra of spectrometer optical input 102. In such embodiments, multiple cycles of spectrometer 100 can be completed to obtain spectra using multiple delays introduced by controllable variable delay element 110 for comparative analysis of each spectra obtained.

In some embodiments, spectrometer 100 can be implemented on a planar substrate or a chip and one method of such implementation is to fabricate spectrometer 100 using electron-beam lithography; however, skilled persons will appreciate that photonic circuits can be fabricated by other methods, such as deep UV lithography.

In embodiments where spectrometer 100 is implemented using electron-beam lithography and where waveguides and other photonic elements on the planar substrate or chip are silicon nitride, a standard silicon wafer can be used having several microns of silicon dioxide thermally grown on a top surface. In some embodiments, a thickness of 3-4 microns of silicon dioxide can be used to implement spectrometer 100; however, skilled person will appreciate that other thicknesses can be used and may be appropriately chosen based on the wavelength range of optical input signals to be analyzed with spectrometer 100.

In such embodiments, silicon nitride can then be deposited onto the silicon wafer, and in some embodiments, a few hundred nanometers of stoichiometric silicon nitride can be deposited using low pressure chemical vapour deposition. An adhesion promotion layer, such as Surpass 3000™, can additionally be applied which can tend to prevent delamination of the electron beam resist. A conductive layer can then be spun onto the silicon wafer, in some embodiments to a thickness of approximately 300 nanometers, and a conductive layer can be spun onto the silicon wafer which can prevent stitching errors due to charging.

The silicon wafer can be patterned using an electron-beam patterning tool at an appropriate current to expose the resist, and after so exposed, the wafer can be rinsed with deionizing water to remove the conducting lawyer. In some embodiments the silicon wafer can be developed with a 300 MIF process to remove unexposed resist. In some embodiments, a descum process can be used with a barrel etcher to remove residual resist and the pattern in the resist can be reflowed, in some embodiments for several minutes, with a hot plate to smooth out any surface roughness.

The silicon wafer can be etched using inductively coupled reactive ion etching (ICP RIE) with a $CHF_3/O_2$. In some embodiments, the resist mask used for etching can be removed in a resist hot strip bath which contains heated solvents.

The silicon wafer can then be plasma cleaned to remove any resist remaining and can be annealed in a furnace oxide tube, in some embodiments at 1200° C. for three hours, to reduce material absorption losses in embodiments where spectrometer 100 is receiving optical inputs at a wavelength that is near infrared.

The silicon wafer can then be covered in oxide, in some embodiments using high temperature oxide deposited in furnace tubes or by plasma enhanced chemical vapour deposition, and lift-off fabrication techniques can be used to define heaters made of evaporated NiCr (in some embodiments, these heaters being controllable delay element 110). The silicon wafer can then be diced and the end facets can be polished which can improve coupling of waveguides and other optical elements formed on the silicon wafer.

Figure 2:
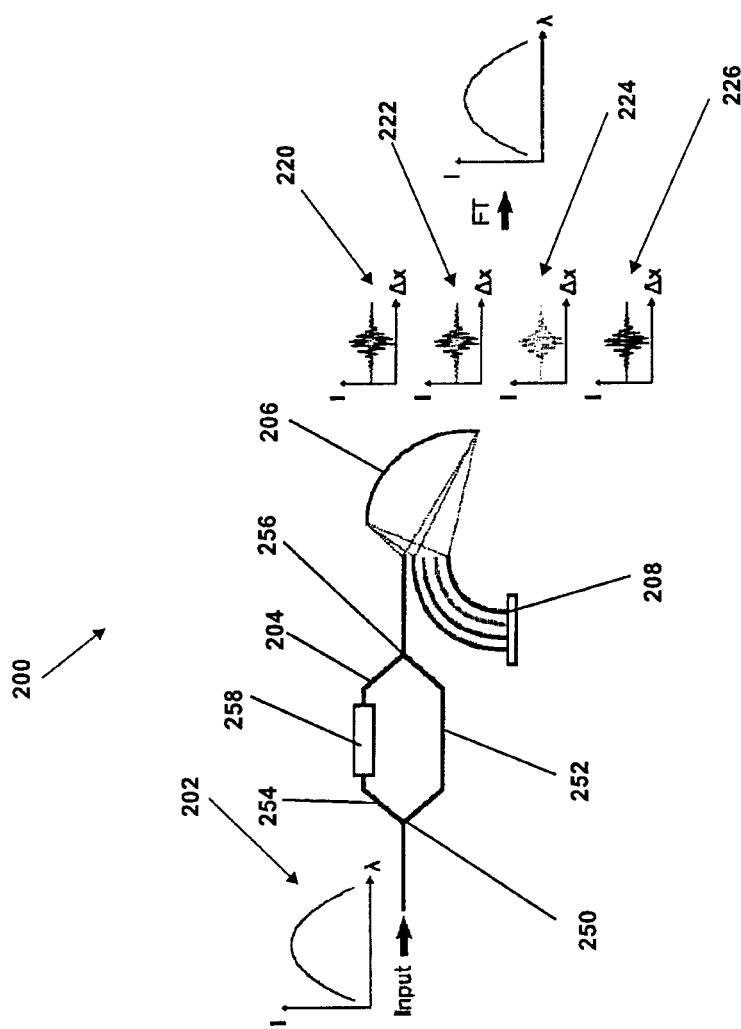
FIG. 2 shows an embodiment of a dispersed Fourier transform spectrometer where the dispersive element is a planar grating.

With reference to FIG. 2 spectrometer 200 is shown having interferometer 204, planar grating 206 and detector array 208. In the embodiment shown, optical input signal 202 can be received by spectrometer 200 by an input waveguide on a planar substrate or a chip for transmission to interferometer 204.

In the embodiment shown, interferometer 204 comprises splitter 250 for splitting input signal 202 into reference arm 252 and variable delay arm 254. In the embodiment shown, splitter 250, reference arm 252 and variable delay arm 254 may to be photonic elements implemented on a planar substrate or chip, and reference arm 252 and variable delay arm 254 may to be waveguides and in some embodiments being silicon nitride waveguides; however, in other embodiments, the waveguides can be constructed of silicon, silicon oxynitride, doped flass or other polymers.

In the embodiment, a variable delay ($\Delta x$) is introduced into variable delay arm 254 by controllable delay element 258 which can vary the refractive index of the waveguide material of variable delay arm 254. Depending on the material of the variable delay arm 254, this can be accomplished, for example, by varying the temperature of variable delay arm 254, for example when controllable delay element 258 is a heating element or cooling element, or by the electro-optic effect in other embodiments. In alternative embodiments, the variable delay can be introduced by the path length of one arm (either variable delay arm 254 or reference arm 252) being longer than the other. Optical recombiner 256 combines and interferes the two split optical signals from reference are 252 and variable delay arm 251 to generate an interferogram which, in the embodiment shown, is then transmitted through a waveguide to planar grating 206.

In the embodiment shown, splitter 250 and recombiner 256 can have a broad bandwidth and can operate with a flat 50:50 splitting and recombining ratio for all wavelengths of interest which can tend to provide low losses. In some embodiments, splitter 250 can be a y-splitter, directional coupler, MMI device, or other beam splitter capable of splitting a received optical signal. In some embodiments, recombiner 256 can have a broad bandwidth by using asymmetrical directional couplers, adiabatic coupling via dressed states or other techniques tending to maintain recombining with a broad bandwidth.

Planar grating 206, in the embodiment shown, is connected to interferometer 204 through a waveguide for transmission of the interferogram generated by interferometer 204. Once received, planar grating 206 disperses the interferogram into component wavelength bands or narrowband interferograms, shown as 220, 222, 224 and 226, representative of the received interferogram and are additionally representative of spectra of the optical input signal 202. In some embodiments, planar grating 206 can be implemented on the same planar substrate or chip as interferometer 204 and, in such embodiments, can be optically connected to interferometer 204 by a waveguide on the planar substrate or chip. In other embodiments, planar grating 206 can be positioned on a separate planar substrate or chip and can be optically connected to interferometer 204 through a fiber cable or other optical transmission means.

In the embodiment shown, planar grating 206 disperses the received interferogram into four narrowband interferograms 220, 222, 224 and 226; however, skilled persons will appreciate that planar grating 206 can be configured to disperse any number of narrowband interferograms. In some embodiments, a filtering device, such as a ring resonator, a disk resonator, a racetrack resonator, a photonic crystal cavity or other filtering device, can be positioned between interferometer 204 and planar grating 206 which can tend to decrease cross-talk between adjacent channels of planar grating 206.

Narrowband interferograms 220, 222, 224 and 226 are received by detector array 208 and, in some embodiments, narrowband interferograms 220, 222, 224 and 226 can be transmitted from planar grating 206 to detector array 208 through waveguides which can be implemented on a planar substrate or chip. Additionally, skilled persons will understand that in some embodiments, detector array 208 can be located on the same planar substrate or chip as planar grating 206 while in other embodiments, detector array 208 can be located in proximity to the planar substrate or chip having planar grating 206 such that narrowband interferograms 220, 222, 224 and 226 can be received by detector array 208 without significant losses, for example environmental or other external interferences or losses. Once received by detector array 208, the interferograms produced by narrowband interferograms 220, 222, 224 and 226 can be processed by a processor (not shown), for example using a Fourier transform to obtain, analyze and/or process spectra of optical input signal 202.

In the embodiment shown, planar grating 206 can be based on Rowland architecture. In such embodiments a waveguide carrying an optical input signal ends and expands to fill planar grating 206 which can have a concave shape, where the reflected light can be focused by the concave shape of planar grating 206 and diffracted by all the facets. In such embodiments, the diffracted light can be focused onto different output channels or waveguides, each corresponding to a different refraction index of the materials of planar grating 206 where the position of the output channels or waveguides can be determined based on the spreading angle of the optical input signal to planar grating 206. Planar grating 206 can be fabricated to have a concave spherical surface with a radius of R, and can have a groove that can be spaced so that there is a constant period over a chord of the concave surface. In some embodiments, other groove spacing topologies can be used to create stigmation points (points with no aberration of any order). In embodiments where planar grating 206 is based on the Rowland architecture, the input waveguide can terminate at a point located on a circle of radius R (typically called the Rowland circle) and points at the centre of the grating where it is tangent to the Rowland circle. In such embodiments, the output channels or waveguides can reside on the outer circumference of the Rowland circle and can point towards the pole of the concave surface which can eliminate second-order aberrations.

Figure 3:
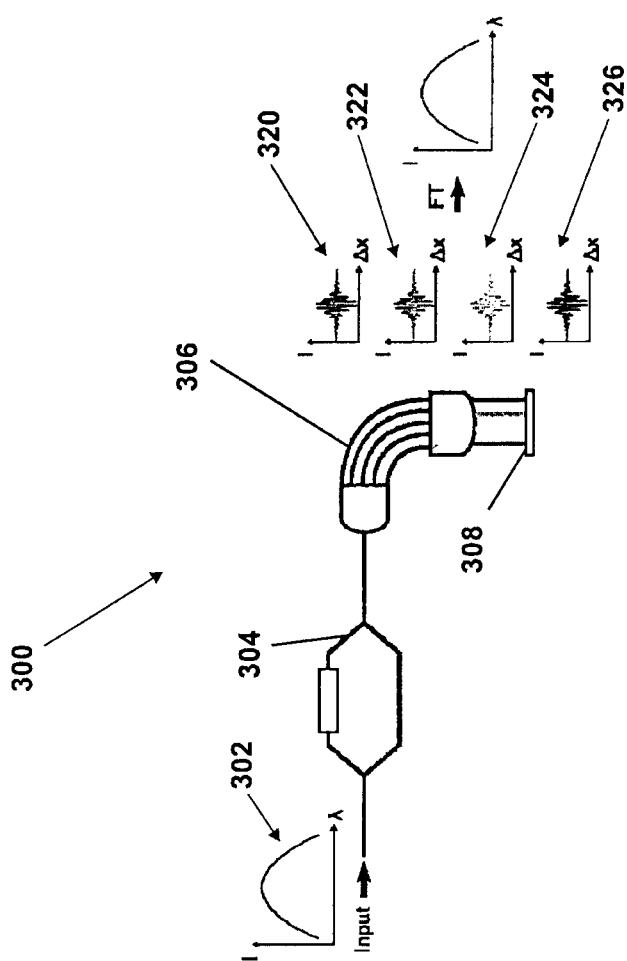
FIG. 3 shows an embodiment of a dispersed Fourier transform spectrometer where the dispersive element is an arrayed waveguide grating.

With reference to FIG. 3, spectrometer 300 is shown, operating similarly to spectrometer 200 shown in FIG. 2. In the embodiment shown in FIG. 3, the planar grating 206 of the spectrometer shown in FIG. 2 has been replaced by arrayed waveguide grating 306. Similar to planar grating 206 as shown in FIG. 2, arrayed waveguide grating 306 can be implemented on the same chip as interferometer 304 and is connected to interferometer 304 through a waveguide for transmission of the interferogram generated by interferometer 304. Once received, arrayed waveguide grating 306 generates a plurality of narrowband interferograms, shown as 320, 322, 324 and 326. In the embodiment shown, arrayed waveguide grating 306 generates four narrowband interferograms; however, skilled persons will appreciate that arrayed waveguide grating 306 can be configured to generate or disperse any number of narrowband interferograms.

Similar to the embodiment shown in FIG. 2, each of narrowband interferograms 320, 322, 324 and 326 are representative of the interferogram generated by interferometer 304 each being an interferogram generated by a narrowband of spectral wavelengths.

Similar to the embodiment shown in FIG. 2, in the embodiment shown in FIG. 3, narrowband interferograms 320, 322, 324 and 326 are received by detector array 308 and, in some embodiments, narrowband interferograms 320, 322, 324 and 326 can be transmitted from arrayed waveguide grating 306 to detector array 308 through waveguides implemented on a planar substrate or chip. Additionally, skilled persons will understand that in some embodiments, detector array 308 can be implemented on the same planar substrate or chip as arrayed waveguide grating 306, while in other embodiments detector array 308 can be positioned in proximity to planar substrate or chip of arrayed waveguide grating 306 such that narrowband interferograms 320, 322, 324 and 326 can be received by detector array 308 without significant losses, for example environmental or other external interferences or losses. Once received by detector array 308, narrowband interferograms 320, 322, 324 and 326 can be processed by a processor (not shown), in some embodiments by Fourier transform to obtain, analyze and/or produce the spectra of optical input signal 302.

Figure 4:
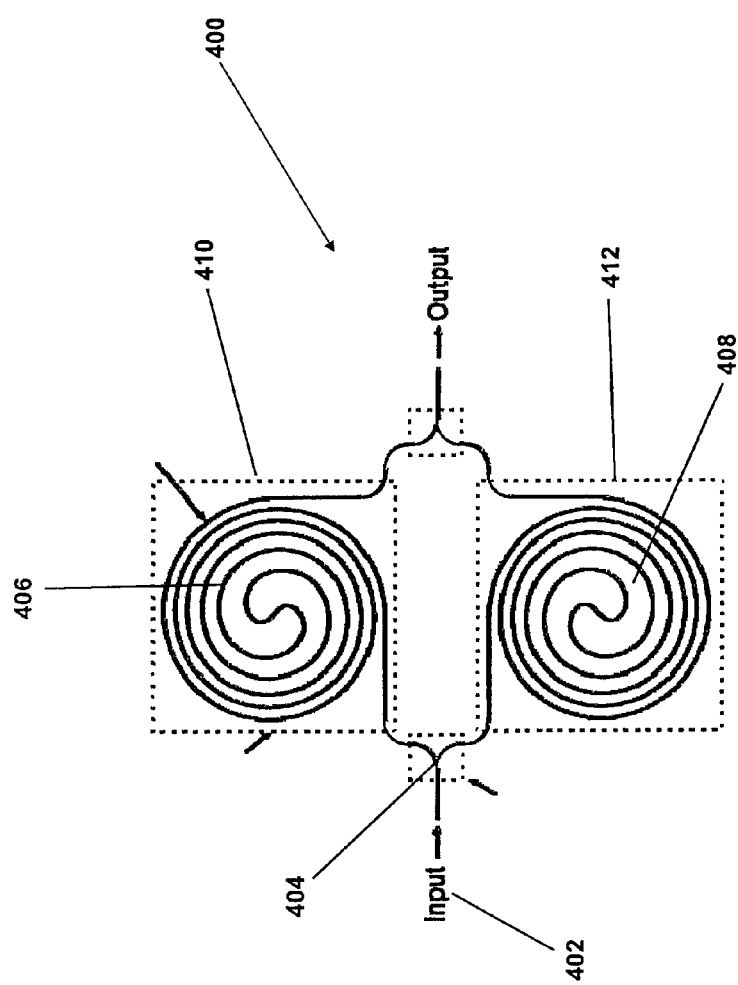
FIG. 4 shows an embodiment of a interferometer capable of generating a variable delay in a split optical signal having spiral waveguides.

As discussed above, Mach-Zehnder interferometers can be implemented on a planar substrate or chip using waveguides and other photonic elements; however, skilled persons will understand that other interferometers can be implemented on a planar substrate or chip for use with a spectrometer. For example, with reference to FIG. 4, interferometer 400 is shown. In this embodiment, a waveguide path with serpentine waveguides 406, 408 can maintain long path lengths of the reference arm and variable delay arm of interferometer 400 while maintaining a small footprint of interferometer 400, which can reduce the size of the planar substrate or chip that interferometer is implemented on. In some embodiments other shapes of waveguides can be used to maintain the length of the reference and variable delay arms but minimize the footprint of interferometer 400 such as a squared spiral or raster-scan.

In some embodiments, delay in the paths can be additionally or alternatively controlled and/or altered by modifying the refractive index of the waveguiding or surrounding materials in one or both arms by, for example: (1) a heater element that can alter the refractive index of a portion of the material of serpentine waveguides 406 or 408 based on their thermo-optic coefficients; (2) a diode structure where charge carriers can change the material index of serpentine waveguides 406 or 408 by the free-plasma dispersion effect; or (3) one or more electrodes which can change the refractive index of serpentine waveguides 406 or 408 by the electro-optic effect.

Figure 5:
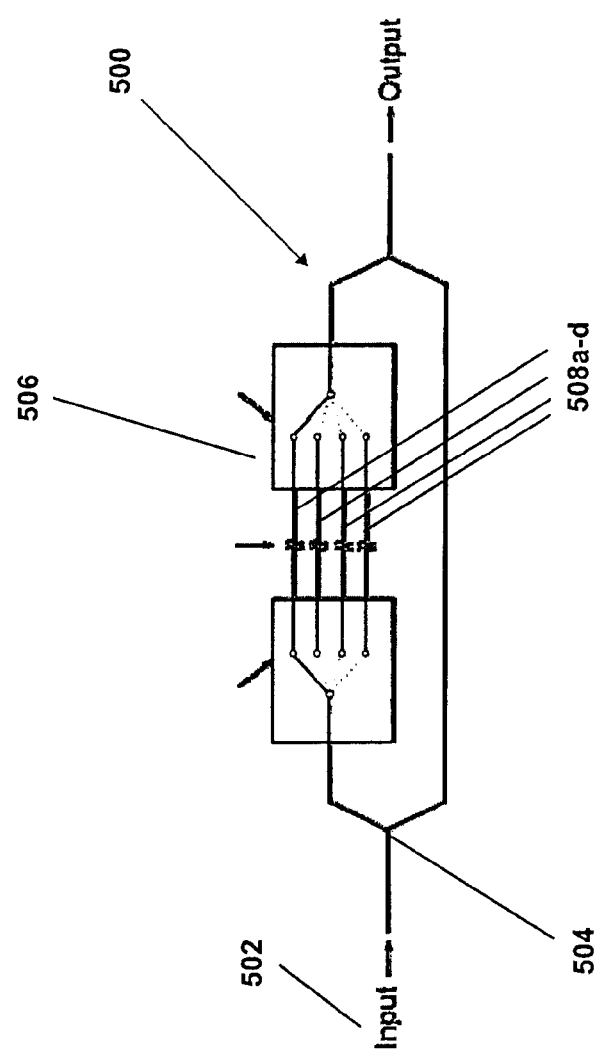
FIG. 5 shows an embodiment of an interferometer capable of generating a variable delay in a split optical signal having an optical switch with multiple paths.

Referring to FIG. 5, an alternative interferometer 500 is shown, for implementation on a planar substrate or chip for use in spectrometry. In the embodiment shown, the delay arm of interferometer 500 can be switched by integrated optical switch 506 to propagate the portion of optical input signal 502 divided out by splitting element 504 down one of paths 508a, 508b, 508c and 508d. Skilled persons will understand that while the embodiment shown in FIG. 5 shows four paths 508a, 508b, 508c and 508d, other embodiments may have additional or fewer paths.

In the embodiment shown in FIG. 5, each path 508a, 508b, 508c and 508d is configured to introduce a different amount of optical delay relative to optical path length of the reference arm transmitting the other portion of split optical input signal 502. The integrated optical switch can be any component which is able to switch light between different waveguides known in the art, such as switches based on ring resonators, Mach-Zehnders, photonic crystals, acousto-optics or other similar switches.

Figure 6:
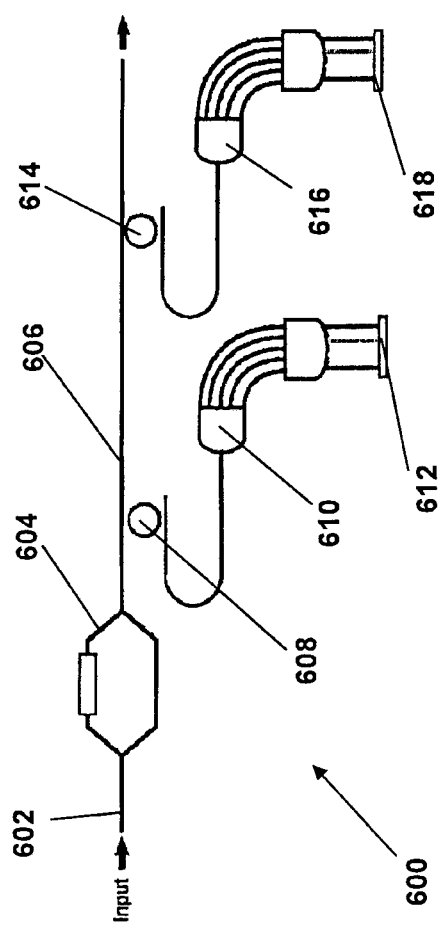
FIG. 6 shows an embodiment of a dispersed Fourier transform spectrometer having multiple dispersive elements in series.

Referring to FIG. 6, spectrometer 600 is shown for receiving optical input signal 602 and having interferometer 604 and bus waveguide 606 which is optically connected to ring resonators 608 and 614 to pick-off narrowband subranges of the broadband interferogram generated by interferometer 604 transmitted along bus waveguide 606. These picked-off portions of the generated interferogram are further transmitted to dispersive elements 610 and 616 respectively, which, in the embodiment shown, are arrayed waveguide gratings; however skilled persons will appreciate that other diffractive components that can be implemented on a chip can be used.

Each of dispersive elements 610 and 616 receives the portion of the interferogram generated by interferometer 604 that has been picked off by ring resonator 608 or 614 and generates a plurality of narrowband interferograms which are representative of the spectra of optical input signal 602. Each of the narrowband interferograms are received by associated detector array 612, 618 and can be processed by a processor (not shown) to obtain, analyze and/or process the spectra of optical input signal 602 by, for example, Fourier transformation of each of the narrowband interferograms.

In such embodiments as shown in FIG. 6, when implementing spectrometer 600 on a planar substrate or chip, multiple dispersed Fourier transform spectrometer systems can be cascaded to cover widely different wavelength regimes which can increase the resolution in a particular wavelength range or region.

In other embodiments, the optical input signal received by the spectrometer can be propagating in a multi-mode fiber. In such embodiments, brightness theorem can preclude efficient coupling of light in a multi-mode fiber to an individual single-mode fiber; however, multi-mode light can be coupled efficiently to a bundle of single-mode fibers. In some embodiments, a multi-mode fiber input can house a bundle of tapered single-mode fibers whose cores gradually decrease in diameter to that of a normal single-mode fiber. Each single-mode fiber can then be coupled to a single-mode waveguide using, for example, a nanotaper or grating. Each waveguide can carry the input light signal to its own microspectrometer.

Figure 7:
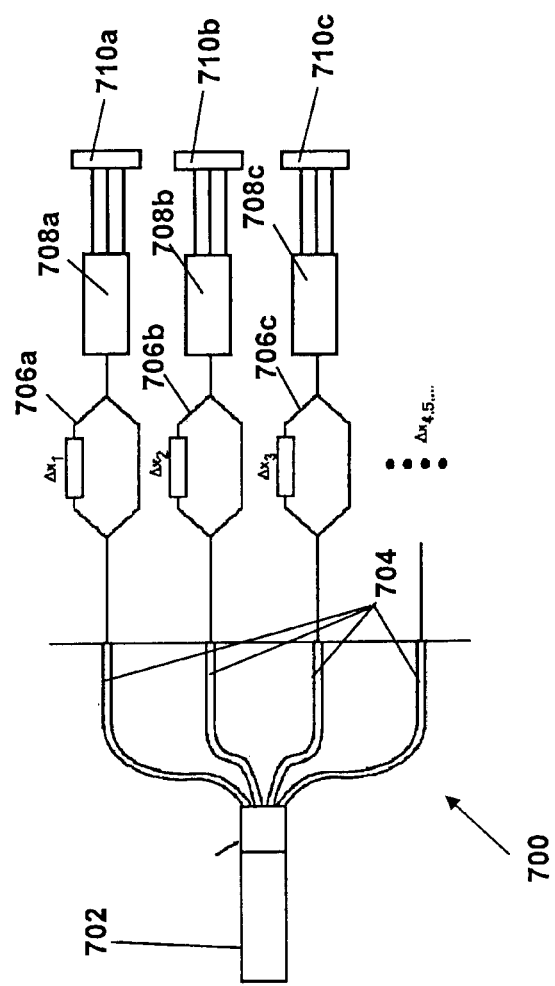
FIG. 7 shows an embodiment of a dispersed Fourier transform spectrometer capable of connecting to a multi-mode fiber input and having multiple interferometer/dispersive element paths.

With reference to FIG. 7, spectrometer 700 is shown. In the embodiment shown, spectrometer 700 is capable of receiving multiple optical input signals through multi-mode fibre input 702, which can comprise multiple fiber inputs 704, each transmitting an optical input signal. Each of the optical input signals are transmitted through waveguides located on a planar substrate or chip to interferometers 706a, 706b and 706c, each of the interferometers implemented on the same planar substrate or chip, or, in alternative embodiments, on different planar substrates or chips.

Each of interferometers 706a, 706b and 706c generate an interferogram by splitting a received optical signal, introducing a delay between the split signals and then combining or interfering the split signals. The delay introduced in each of interferometer 706a, 706b and 706c can be the same or, in other embodiments, can be different, such that each interferometer 706a, 706b and 706c can generate an interferogram based on a different delay. In the embodiment shown, interferometers 706a, 706b and 706c are Mach-Zehnder interferometers; however, skilled persons will understand that other interferometers can be used.

Each of the interferograms are then transmitted through a waveguide to dispersive elements 708a, 708b and 708c respectively. Each of dispersive elements 708a, 708b and 708c generates a plurality of narrowband interferograms which are received by detector arrays 710a, 710b and 710c and processed by a processor (not shown), for example, for processing by Fourier transform to obtain, analyze and/or process the interferograms to generate a spectra of the optical input signal originating from multi-mode fiber input 702.

While the embodiment shown in FIG. 7 shows three interferometers each connected to a dispersive element with an associated detector array, skilled persons will understand that in other embodiments, spectrometer 700 can comprise any number of interferometers each connected to a dispersive element with an associated detector array.

The present invention has been described with regard to specific embodiments. However, it will be obvious to persons skilled in the art that a number of variants and modifications can be made without departing from the scope of the invention as described herein.

We claim:

1. A spectrometer comprising:
an interferometer configured for generating an interferogram by splitting an interferometer input signal between a reference arm and a variable delay arm, and introducing a delay between the split interferometer signals prior to interfering the split interferometer signals;
a dispersive element configured for outputting simultaneously a plurality of narrowband outputs representative of a received broadband input signal; and
a detector array configured for simultaneously receiving a plurality of narrowband interferograms and configured for simultaneously analyzing each of the plurality of narrowband interferograms;
wherein the variable delay arm comprises a controllable delay element operable to adjust the delay introduced by the interferometer; and
wherein the interferometer and dispersive element are optically connected to output simultaneously the plurality of narrowband interferograms representative of a spectra of a spectrometer input signal received by the spectrometer, and the plurality of narrowband interferograms are received by the detector array for analysis.

2. The spectrometer of claim 1, wherein the reference arm and variable delay arm are waveguides formed on a substrate.

3. The spectrometer of claim 2, wherein the controllable delay element is configured for adjusting the refractive index of a portion of the variable delay arm to introduce the delay.

4. The spectrometer of claim 3, wherein the controllable delay element is configured for adjusting the refractive index of the variable delay arm by the electro-optic effect.

5. The spectrometer of claim 2, wherein the reference arm and delay arm are comprised of material that is transparent in the wavelength range of the received optical signal.

6. The spectrometer of claim 5, wherein the material is silicon, silicon oxynitride, silicon nitride, doped glass or a polymer.

7. The spectrometer of claim 1, wherein the spectrometer input signal is coupled to the input of the interferometer and the interferogram is coupled to the input of the dispersive element.

8. The spectrometer of claim 1, further comprising an input connector configured for connecting with a fiber input to receive the spectrometer input signal.

9. The spectrometer of claim 1, wherein the spectrometer input signal is coupled to the input of the dispersive element and at least one of the plurality of narrowband outputs of the dispersive element is coupled to the input of the interferometer.

10. A method for generating a plurality of narrowband interferograms representative of a spectra of an input signal, the method comprising:
splitting the input signal into a reference arm and a variable delay arm, the variable delay arm comprising a controllable delay element;
introducing a delay between the split signals through the controllable delay element;
interfering the split input signals after having introduced the delay to generate an interferogram; and
dispersing simultaneously the interferogram into the plurality of narrowband interferograms representative of the spectra of the input signal.

11. A method for generating a plurality of narrowband interferograms representative of a spectra of an input signal, the method comprising:
dispersing simultaneously the input signal into a plurality of narrowband outputs representative of the spectra of the input signal;
splitting each of the plurality of narrowband outputs into a reference arm and a variable delay arm, the variable delay arm comprising a controllable delay element;
introducing a delay between each of the plurality of split narrowband outputs through each controllable delay element; and
interfering each of the plurality of split narrowband outputs after having introduced the delay to generate the plurality of narrowband interferograms.

* * * * *